(12) United States Patent
Berezina

(10) Patent No.: US 12,497,582 B2
(45) Date of Patent: Dec. 16, 2025

(54) SYSTEM AND METHOD FOR GROWING BIOMASS

(71) Applicant: NBTECH AB, Järfälla (SE)

(72) Inventor: Nathalie Berezina, Järfälla (SE)

(73) Assignee: NBTECH AB, Järfälla (SE)

( * ) Notice: Subject to any disclaimer, the term of this patent is extended or adjusted under 35 U.S.C. 154(b) by 525 days.

(21) Appl. No.: 18/017,079

(22) PCT Filed: Jul. 8, 2021

(86) PCT No.: PCT/EP2021/068962
§ 371 (c)(1),
(2) Date: Jan. 19, 2023

(87) PCT Pub. No.: WO2022/022969
PCT Pub. Date: Feb. 3, 2022

(65) Prior Publication Data
US 2024/0034975 A1    Feb. 1, 2024

(51) Int. Cl.
*C12M 1/16*    (2006.01)
*A01K 67/30*    (2025.01)
(Continued)

(52) U.S. Cl.
CPC .............. *C12M 23/48* (2013.01); *A01K 67/30* (2025.01); *C12M 21/16* (2013.01); *C12M 23/04* (2013.01); *C12M 23/50* (2013.01); *C12M 33/14* (2013.01)

(58) Field of Classification Search
CPC ........ A01K 67/30; C12M 21/16; C12M 23/04
See application file for complete search history.

(56) References Cited

U.S. PATENT DOCUMENTS 5,554,533 A * 9/1996 Bedding ................. A01K 67/30
 422/562
6,197,573 B1 * 3/2001 Suryanarayan ........ C12M 41/22
 435/291.3

(Continued)

FOREIGN PATENT DOCUMENTS

CN    110449450 A    11/2019
JP    H09 172910 A    11/2013
(Continued)

*Primary Examiner* — Jonathan M Hurst
(74) *Attorney, Agent, or Firm* — James S. Keddie; Bozicevic, Field & Francis LLP (57) ABSTRACT

A system (100, 200, 400, 700) and method for growing biomass, wherein the system comprises at least one growing unit (110, 210, 410, 710) having a respective controllable environment and comprising a first area (120, 220, 420, 720) and a second area (130, 230, 430, 730). The system further comprises at least one plate-grid device (140, 240, 441, 442, 443, 500, 740) arranged within said at least one growing unit in turn comprising at least one plate (225, 325, 510) elevated from at least one grid (226, 326, 530, 631, 632, 633, 634) wherein the at least one plate and the at least one grid are independently movable from one another between the first area and the second area. Additionally, the system comprises a decontamination device (160, 260, 461, 462) arranged within the second area and configured to decontaminate, in the second area, one or more of the at least one plate and/or at least one grid of the at least one plate-grid device. Furthermore, the at least one plate and at least one grid of each at least one plate-grid device are movable independently from the at least one plate and at least one grid of the other plate grid devices between a loading position (171, 471, 771), at which the at least one plate is free to receive a growth medium for growing biomass, and a discharging position (172, 472, 772), within the first area. The system further comprises at least one transporting mechanism (150, (Continued)

250, 450, 750) configured to transport grown biomass discharged from the at least one plate-grid device at the discharging position, to a third area arranged outside of the at least one growing unit.

15 Claims, 9 Drawing Sheets (51) Int. Cl.
  C12M 1/00 (2006.01)
  C12M 1/12 (2006.01)
  C12M 1/26 (2006.01)
  C12M 3/00 (2006.01)

(56) References Cited

U.S. PATENT DOCUMENTS

| | | | |
|---|---|---|---|
| 6,620,614 B1* | 9/2003 | Luth | C12M 23/34 |
| | | | 435/813 |
| 2006/0240544 A1* | 10/2006 | Shiau | C12M 27/14 |
| | | | 435/292.1 |
| 2014/0261188 A1 | 9/2014 | Chin | |
| 2015/0353879 A1* | 12/2015 | Lin | C12M 47/14 |
| | | | 435/243 |
| 2018/0057784 A1* | 3/2018 | Wang | C12M 27/02 |
| 2019/0387704 A1* | 12/2019 | Hall | A01K 67/30 |
| 2023/0279336 A1* | 9/2023 | Iglesias-Musachio | |
| | | | C12M 27/12 |
| | | | 435/254.1 |
| 2023/0295546 A1* | 9/2023 | Berezina | C12M 23/04 |
| | | | 435/297.1 |
| 2023/0345920 A1* | 11/2023 | Chen | A01K 67/30 |
| 2024/0034975 A1* | 2/2024 | Berezina | C12M 23/48 |

FOREIGN PATENT DOCUMENTS

| | | |
|---|---|---|
| KR | 20130127696 A | 11/2013 |
| KR | 102028116 B1 | 10/2019 |
| KR | 102114733 B1 | 5/2020 |

* cited by examiner

SYSTEM AND METHOD FOR GROWING BIOMASS

CROSS-REFERENCE TO RELATED APPLICATIONS

This application is a § 371 national phase of International Application No. PCT/EP2021/068962, filed on Jul. 8, 2021, which claims the benefit of European Application No. 20187892.3, filed on Jul. 27, 2020, which applications are incorporated by reference herein.

TECHNICAL FIELD

The inventive concept described herein generally relates to the culture of heterogeneous biomass. More specifically, the present inventive concept relates to a system and method for growing heterogeneous biomass in a controllable environment.

BACKGROUND

The use of biomass for the production of energy has attracted and continues to attract attention and interest in the current global environmental situation. The growing desire of industries to move away from fossil fuels and into renewable energy has increased the priority given to the production of biomass from organic matter derived from vegetable organisms, animals, bacteria and fungi, amongst others.

One of the most commonly seen approach to the production of biomass is represented by processes for growing heterogeneous biomass, for example through solid state fermentation techniques or cultivation of fungi and insect production.

However, growing of heterogeneous biomass suffers from several issues such as difficulty of biomass control, heterogeneity among individuals and contamination of growing areas and of the biomass itself. Solutions attempting to resolve these issues have been proposed in the past but remain slightly insufficient. For example, for solid state fermentation techniques, specifically designed reactors have been used to ensure the control and the sterility of the biomass growing process, but such solution has been found to limit the volume and amount of produced biomass making it only suitable for the production of biomass with high added value molecules. For the cultivation of fungi and insect production, the currently privileged approach is the accumulation of rearing in breeding units requiring transportation of these breeding to operation areas e.g. as disclosed in prior art WO2014/171829. The problematic faced by such approach lies in the transportation of biomass through large common spaces, with the inherent risk of contamination.

Hence, it is an object of the present invention to try and overcome at least some of the deficiencies of present biomass growing approaches specifically pertaining to mitigation of the contamination risk and enhancement of productivity.

SUMMARY OF THE INVENTION

It is an object of the present inventive concept to mitigate, alleviate or eliminate one or more of the above-identified deficiencies in the art and disadvantages singly or in combination. According to a first aspect of the inventive concept, these and other objects are achieved in full, or at least in part, by a system for growing biomass. The system comprises at least one growing unit having a respective controllable environment and comprising a first area and a second area. The system further comprises at least one plate-grid device arranged within said at least one growing unit in turn comprising at least one plate elevated from at least one grid wherein the at least one plate and the at least one grid are independently movable from one another between the first area and the second area. Additionally, the system comprises a decontamination device arranged within the second area and configured to decontaminate, in the second area, one or more of the at least one plate and/or at least one grid of the at least one plate-grid device. Furthermore, the at least one plate and at least one grid of each at least one plate-grid device are movable independently from the at least one plate and at least one grid of the other plate grid devices between a loading position, at which the at least one plate is free to receive a growth medium for growing biomass, and a discharging position, within the first area. The system further comprises at least one transporting mechanism configured to transport grown biomass discharged from the at least one plate-grid device at the discharging position, to a third area arranged outside of the at least one growing unit.

According to a second aspect of the inventive concept, there is provided a method for growing biomass using a system sharing the particularities described in the first aspect of the inventive concept. The second aspect further provides the method comprising the steps of receiving a growth medium on the at least one plate at the loading position in the first area of the at least one growing unit; containing the growth medium on the at least one plate in the first area for the duration of a growth period of biomass and discharging the growth medium onto the at least one grid at the discharging position in the first area of the at least one growing unit. The method according of the second aspect further provides the steps of separating the grown biomass and undesirable substances of the growth medium by means of the at least one grid; discharging the grown biomass onto the transport mechanism and transporting said grown biomass to the third area; decontaminating the at least one plate in the second area by means of the decontamination device and decontaminating the at least one grid in the second area by means of the decontamination device. Moreover, the step of decontaminating the at least one plate occurs simultaneously as the step of separating the grown biomass by means of the at least one grid and step of decontaminating the at least one grid occurs simultaneously as the step of receiving the growth medium on the at least one plate.

It is envisioned that one or several features of the first aspect of the invention, and its associated advantages and technical effects, are applicable also to the second aspect of the invention.

Thus, the present invention stems from the idea of providing enhancement of the production of biomass and eradication, or at least reduction to a minimum, of harmful contamination of biomass throughout its growing and harvesting process. In other words, the present inventive concept enables control and monitoring of the contamination of areas in which biomass is grown and harvested, specifically pertaining to areas in which the growing biomass is moved and to areas in which the harvested biomass is transported. A further purpose of the present invention is to capacitate the system for growing biomass to reach higher volume, amount and diversity of produced biomass through individuality of growing schemes and independently controllable parameters of areas in which the biomass is grown and harvested. The present inventive concept therefore stems from the idea of permitting growing units to operate at respective controlled environments while decontaminating said growing units and the equipment enclosed therein separately without affecting the biomass growing schemes, thereby enabling increased efficiency of the production of biomass whilst yielding biomass of higher quality.

The present invention is hereby advantageous in that the respective controllable environment of the growing unit permits the biomass to grow in environmental conditions adapted to optimize its growing process from insemination to harvesting and storing thereafter. The respective controllable environment of the growing unit therefore enables each specific phase of the biomass growing process to be provided with a specifically adapted environment enabling increased yielding of said specific phase. It will be appreciated that the controllability of the environment of the growing unit encompasses its monitoring and control for each phases of the biomass growing process but also for different types of biomass grown e.g. rearing and growing of small animals, mushrooms or plants, small algae, etc. Furthermore, the system and method according to the first and second aspects of the present invention provide the possibility of having several growing units with respective controllable environment thus permitting scalability of the present inventive concept in turn increasing the volume of biomass production and the variability of biomass grown. In other words, the scalability, i.e. operating a system with a plurality of growing units, allows the different growing units to operate at differently or similarly controlled environments, enabling a greater production rate of biomass and a diversity of biomass growing processes and methods.

Additionally, the present invention is advantageous in that the division of the growing unit into a first area and a second area enables a separation between the biomass growing process and the decontamination process of the at least one plate-grid device arranged in the growing unit preventing the decontamination process from affecting the biomass growing process. Furthermore, the provision of both a first area and second area enables the decontamination process to occur simultaneously as the biomass growing process resulting in the increase of biomass production of the system as the growing scheme to which the biomass growing process abides is not required to be paused or stopped for decontamination of the at least one plate-grid device.

The present inventive concept is further advantageous in that the at least one plate-grid device permits the biomass to grow from a growth medium deposited on the at least one plate and permits grown biomass to be separated from the growth substrate and other undesirable substances thereon by the at least one grid once the biomass is successfully grown and ready for harvesting. The elevation of the least one plate from the at least one grid and the movability of the at least one plate independently from the at least one grid within the first area further permits the alignment of the at least one plate above the at least one grid allowing the growth medium held by the at least one plate to be discharged onto the at least one grid once successful growth of the biomass is achieved. Furthermore, the movability of the at least one plate independently from the at least one grid between the first area and the second area is advantageous in that it allows each plate and each grid of the at least one plate-grid device to move to the second area to be subjected to the decontamination process and move back to the first area once decontaminated to receive a new growth medium and reiterate the biomass growing process.

The present invention is further advantageous in that decontamination device arranged in the second area permits the at least one plate-grid device and the at least one growing unit to be decontaminated throughout the biomass growing process, in turn resulting in a higher quality of biomass produced.

The present invention is further advantageous in that the transporting mechanism enables continuity and efficiency of production of biomass by permitting the displacement of grown biomass outside of the growing unit. The transporting mechanism therefore liberates the at least one grid of the plate-grid device from having to hold harvested biomass for considerable periods of time and enables the at least one grid to move to the second area to be subjected to the decontamination process rapidly after having separated the grow biomass from the growth substrate and other undesirable substances, thus yielding greater biomass productivity.

The present invention is further advantageous in that the method according to the second aspect also permits the enhancement of productivity of biomass, its quality and the possibility to maintain a decontaminated plate-grid device(s) and areas. For example, the simultaneous occurrence of the step of decontaminating the at least one plate and the step of separating the grown biomass allow the growing process to be shorter in time thus yielding a higher volume of produced biomass. The simultaneous occurrence of the above method steps further enables a more recurrent decontamination of the plate-grid device(s) therefore advantageous with regard to maintaining cleaned and decontaminated plate-grid device(s) and areas. Similar advantages are provided by the simultaneous occurrence of the steps of decontaminating the at least one grid and the step of receiving the growth medium on the at least one plate.

By the term "growing unit" it is here meant an enclosure comprising dimensions in space and providing isolation between its enclosed environment and the surrounding environment.

By the term "controllable environment" it is here meant an environment or atmosphere of which the parameters of, but not limited to, pressure, temperature, humidity and air quality are controllable.

By the term "growing process" it is here meant the process required to achieve successfully grown biomass from insemination to harvesting. A growing process may comprise a plurality of parts in turn comprising a plurality of biomass growing stages or phases.

By the term "growing scheme" it is here meant a schedule of time-based planning to which a biomass growing process may abide. In other words, a growing scheme may relate to the combined duration of various stages of growth of biomass over time or to the combined duration of a plurality of biomass growing cycles over a resulting in the organization of a time-period.

By the term "growth medium" it is here meant a substrate or growing support material enabling ideal conditions and characteristics for biomass to grow thereon successfully. A growing medium may be represented, but not limited to soil, coconut coir, growstones, expanded clay aggregate, perlite etc. A growing substrate may be a combination or mixture of a plurality of substrates including, but not limited to, water, vitamins, oligo-elements, etc.

According to an embodiment of the present invention, the system may comprise at least one or more of a movable robotic arm, a feeding system, a watering system, a sensor arrangement arranged in the first area and adapted to perform a plurality of operations on the growth medium on the at least one plate-grid device, wherein the plurality of operations comprises at least one of: insemination, watering, removal of undesired substances, addition of nutrients, analysis of biomass growth, monitoring of biomass growth, cleaning of growth medium. The present embodiment is principally advantageous in that it allows a precise control of the growth process of the biomass. The plurality of operations may further be performed on the growth medium at any stage of the growing process i.e. when the growth medium is held by the at least one plate and/or when the growth medium is held by the at least one grid of the at least one plate-grid device. The present embodiment is further advantageous in that the plurality of operations also allow adaptability of the growing scheme based on the feedback generated by the analysis and monitoring of biomass growth. In other words, the growing scheme may be modified based on the results of the operations performed on the growth medium to enhance the quality of the biomass grown and increase its production. Additionally, the present embodiment is advantageous in that it contributes in maintaining a clean and decontaminated plate-grid device and area of biomass growth. It will be appreciated that the means for conducting the plurality of operations may comprise other devices, systems or arrangements than the above-listed ones provided that such other devices, systems or arrangements may perform the plurality of operations on the growing biomass increasing its quality and control.

According to an embodiment of the present invention, the system may comprise at least one of a heating system, a cooling system, a ventilation system, configured to control the respective controllable environment according to one or more respective growing schemes. The present embodiment permits the environment and atmosphere in which the biomass is grown to be optimized and specifically adapted to the type of biomass growing process and the type of biomass grown resulting again in the enhancement of the quality of the biomass and ultimately yielding to greater production of said biomass. The present embodiment further facilitates the maintaining of a clean and decontaminated area in which the biomass is grown. It will be appreciated that the at least one heating system, a cooling system, a ventilation system may be positioned in the first area and/or in the second area providing the entire growing unit with a controllable environment. The present embodiment is further advantageous in that it allows different growing units to have differently controlled environment specifically adapted to the type of biomass growing process and the type of biomass grown in each respective growing unit. The present embodiment therefore enables the possibility to have a greater variety of biomass grown and a greater variety of growing schemes.

According to an embodiment of the present invention, the system may comprise at least one control unit, wherein the at least one control unit is configured to operate the at least one of a heating system, a cooling system, a ventilation system to control one or more of a temperature, a pressure, a humidity of the respective controllable environment. Furthermore, the at least one control unit may be configured to individually control the respective controllable environment of the at least one growing unit. The present embodiment is advantageous in that it allows specific parameters of a controllable environment to be managed according to the type of biomass growing process and the type of biomass grown in each respective growing unit. The control of such parameters, i.e. temperature, pressure, humidity, atmosphere, enables the at least one growing unit to reach customized conditions for its controllable environment. It will be appreciated that the at least one control unit may be placed outside of the at least one growing unit which controllable environment said control unit controls. It is further envisioned that several growing units may have a controllable environment controlled by the same control unit. It is also envisioned that the control unit may be positioned in the first area and/or the second area of the at least one growing unit.

According to an embodiment of the present invention, the at least one growing unit may be arranged in a growing space having a respective controlled environment. By the term "growing space" it is here meant an enclosure comprising dimensions in space and providing isolation between its enclosed environment and the surrounding environment. The present embodiment is advantageous in that it enables storing of harvested biomass having been transported out of the at least one growing unit by means of the transporting mechanism. The respective controllable environment of the growing space enables harvested biomass to remain in a controlled environment after exiting the at least one growing unit resulting in a greater conservation of the biomass prior to being transported out of the growing space for further processing or transformation. It will be appreciated that the controllable environment of the growing space may be controlled by at least one control unit enabling the control of one or more of a temperature, a pressure and a humidity as similarly described in previous embodiments. It will also be appreciated that the growing space may be the third area recited in the first and second aspects of the present invention.

According to an embodiment of the present invention, the first area and the second area of the at least one growing unit may be separated by a partition, wherein the partition is configured to allow the at least one plate-grid device to move therethrough. The present embodiment is advantageous in that it permits that no decontamination product or water from the second area affect the biomass growing in the first area when decontamination of the at least one plate and the at least one grid occurs. The present embodiment is further advantageous in that it does not hinder the displacement of the at least one plate and at least one grid of between the first area and the second area of the at least one growing unit. The partition may be a thin wall at least partially dividing the enclosure of the at least one growing unit into the first and second areas. Additionally, it will be appreciated that the partition does not prohibit the first area and the second area from being in the same controllable environment. In other words, the partition does not affect the control of the respective controllable environment of the at least one growing unit.

According to an embodiment of the present invention, the system may further comprise an auxiliary area arranged within the first area, wherein the at least one of a temperature, a pressure, a humidity within the auxiliary area is respectively controlled by at least one of an auxiliary heating system, an auxiliary cooling system, an auxiliary ventilation system operated by the at least one control unit. The present embodiment is advantageous in that it permits the at least one growing unit to enable a biomass growing process requiring differently controlled environment for different parts of the growing process. In other words, the capacity of having a differently controlled environment in the auxiliary area relative to the rest of the first area allows the growing process to have several stages of growth to reach successful biomass growth without affecting the growing scheme. For example, slightly different conditions of environment may be required for eggs' hatching and/or juvenile insects and/or mature-adult biomass. In such case a transfer of the at least one plate or the at least one grid from the first area to the auxiliary area results in an optimized biomass growth.

According to an embodiment of the present invention, the decontamination device may comprise at least one of a sprinkler arrangement, a hose arrangement, a washing tunnel. The present embodiment is advantageous in that it enables decontamination of the at least one plate and the at least one grid of the at least one plate-grid device resulting in the control and maintenance of a decontaminated area of the at least one growing unit. It will be appreciated that the decontamination device may be represented by alternative devices, systems and/or arrangements than the ones stated above provided that such alternative devices, systems and/or arrangements fulfil the technical function of decontamination of the at least one plate-grid device and of the growing unit without hindering the biomass growing process or the growing scheme to which it abides.

According to an embodiment of the present invention, the system may further comprise an additional decontamination device arranged in the first area and configured to decontaminate the first area, wherein the additional decontamination device comprises at least one of a sprinkler arrangement and a hose arrangement. The present embodiment is advantageous in that it allows the first area to be decontaminated, e.g. between two successive growing processes, resulting in the maintenance of a clean and decontaminated first area. The present embodiment therefore enables the reduction of the risks of contamination in the first area thus leading to a higher quality of the biomass grown therein.

According to an embodiment of the present invention, the at least one control unit may further be configured to operate the at least one of a movable robotic arm, a feeding system, a watering system, a sensor arrangement. The present embodiment is advantageous in that it enables the centralization of the control of the means to perform the plurality of operations and the means to control the respective controllable environment of the at least one growing unit. The present embodiment therefore provides a simpler control of the system for growing biomass. It will be appreciated that the at least one growing unit and the growing space in which the at least one growing unit is arranged are operated in a fully automated manner.

According to an embodiment of the present invention, the method for growing biomass may comprise the step of performing a first operation phase on the growth medium on the at least one grid by means of the one or more of a movable robotic arm, a feeding system, a watering system, a sensor arrangement. Furthermore, the first operation phase may comprise at least one operation from inseminating, removal of undesired substances, analysis of biomass growth, monitoring of biomass growth, cleaning of growth medium. The present embodiment is advantageous in that it allows a precise control of the growth process of the biomass and provides a possibility to analyze the progress of the biomass growth. Additionally, by being performed on the growth medium on the at least one grid, the first operation phase may be performed before separation of the biomass from the growth medium and undesirable substances and/or after such separation i.e. only on the separated biomass. The present embodiment is therefore advantageous in that it increases the quality of the biomass grown and ensures its successful growth.

According to an embodiment of the present invention, the method may comprise the step of returning the growth medium from the at least one grid to the at least one plate by positioning the at least one grid above the at least one plate and discharging said growth medium. The present embodiment is advantageous in that it allows the growth medium to continue or prolong the growing process of the biomass in the events that the growth has not been found successful based on the results provided by the first phase of operations. The present embodiment further enables the growth process of the biomass to encompass several stages of growth in between which the operations of the first operation phase may be performed on the growth medium resulting in a higher quality of biomass grown.

According to an embodiment of the present invention, the method may comprise a step of performing a second operation phase on the growth medium on the at least one plate by means of the one or more of a movable robotic arm, a feeding system, a watering system, a sensor arrangement. Furthermore, the second operation phase may comprise at least one operation from watering and addition of nutrient. Similarly to the first operation phase, the present embodiment is advantageous in that it allows a precise control of the growth process of the biomass therefore increasing the quality of the biomass grown and ensures its successful growth. It will be appreciated that the operations of at least one of watering and addition of nutrient may be performed on the growth medium on the at least one plate even if the first operation phase has not yet been performed on the at least one grid.

It is envisioned that one or several features of an embodiment described above, and its associated advantages and effects, may be combined with one or several features of one or several of the remaining embodiments described in the present disclosure.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of the present inventive concept, with reference to the appended drawings, wherein.

The figures are not necessarily to scale, and generally only show parts that are necessary in order to elucidate the inventive concept, wherein other parts may be omitted or merely suggested.

DETAILED DESCRIPTION

Figure 1A:
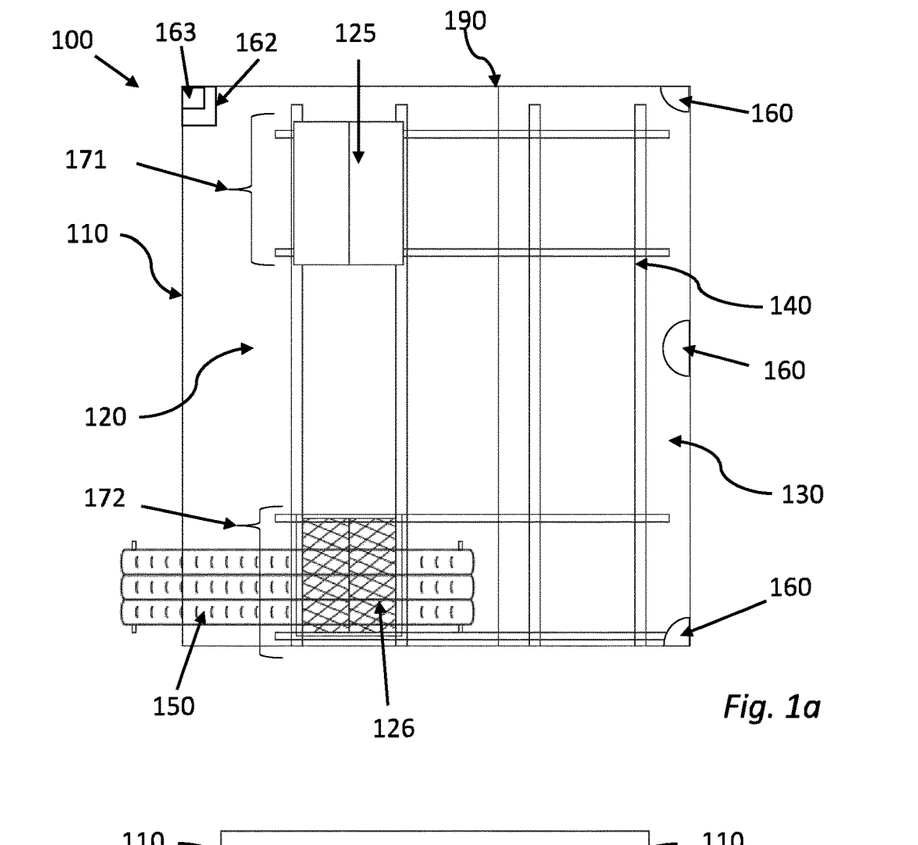
FIG. 1a schematically illustrates a top view of a system for growing biomass.
Figure 1B:
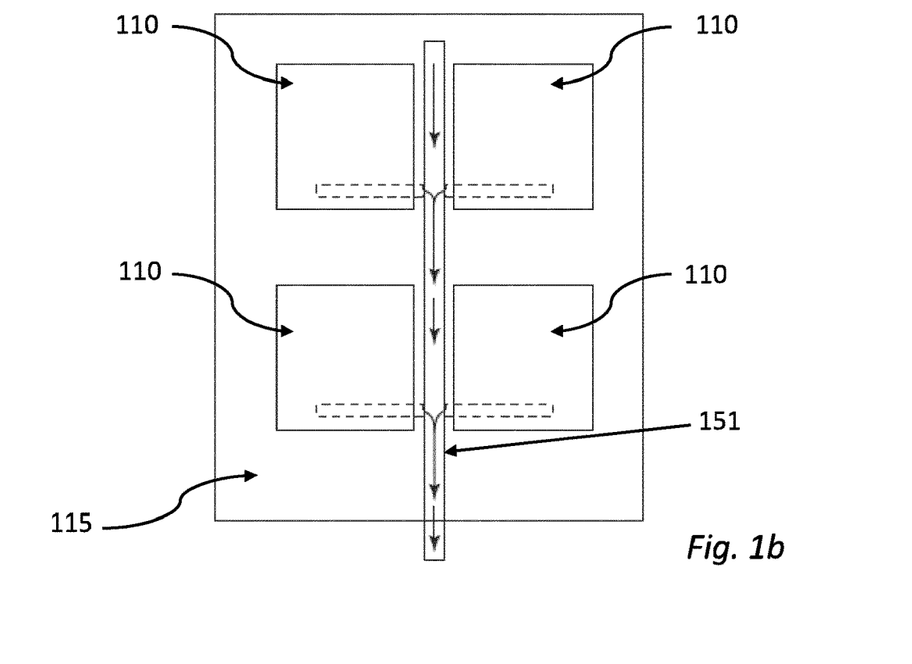
FIG. 1b schematically illustrates a top view of a growing space.

FIG. 1 illustrates a first embodiment of a system 100 for growing biomass. The system 100 comprises a growing unit 110 separated into a first area 120 and a second area 130 by a partition 190. FIG. 1 further illustrates a plate-grid device 140 positioned in the growing unit 110 and comprising a loading position 171, at which the plate 125 of the plate grid device 140 is free to receive a growth medium (not shown) for growing biomass, and a discharging position 172 at which the grid 126 is positioned. FIG. 1 further illustrates both the plate 125 and the grid 126 positioned in the first area 120 of the growing unit 110. Additionally, FIG. 1 illustrates a transporting mechanism 150 arranged in the first area 120 extending from said first area 120 to the outside of the growing unit 110 for transporting harvested biomass out of the growing unit 120 and into a third area (not shown). The growing unit 110 of FIG. 1 is embodied having a controllable environment controlled by a ventilation system 162 operated by a control unit 163 both positioned in the first area 120 of the growing unit 110. It is additionally embodied that the ventilation system 162 may alternatively be one of a heating system and/or a cooling system. It is additionally embodied that the ventilation system 162 and the control unit 163 may be positioned anywhere in the growing unit 110 provided they control the parameters of the controllable environment of said growing unit 110. FIG. 1 further depicts a decontamination device 160 in the form of a sprinkler system positioned in the second area 130 for performing decontamination of the plate-grid device in the second area 130. It will be additionally embodied that the decontamination device may alternatively be one of a hose arrangement and/or a washing tunnel. FIG. 1b illustrates a top view of a growing space 115 comprising a plurality of growing units 110 positioned separately within the enclosure of the growing space 115 and isolated from one another. FIG. 1b illustrates each growing unit 110 having their respective transport mechanisms, shown in dotted lines, connecting with a common transport mechanism 151 positioned in the center of the growing space 115 for transporting harvested biomass outside of the growing space 115 to a subsequent area for further transformation 151 of the biomass or for packaging. It is additionally embodied that the common transport mechanism may be positioned elsewhere within the growing space 115 and may embody curvatures and/or turns in its configuration to accommodate the availability of space in the growing space 115. Each growing unit 110 shown in FIG. 1b have respective controllable environment which may be controlled differently from one growing unit to the other and differently from the controllable environment of the growing space 115. It is also embodied that the growing space 215 may be a third area reserved for storing of grown biomass or for further transformation of the grown biomass.

Figure 2:
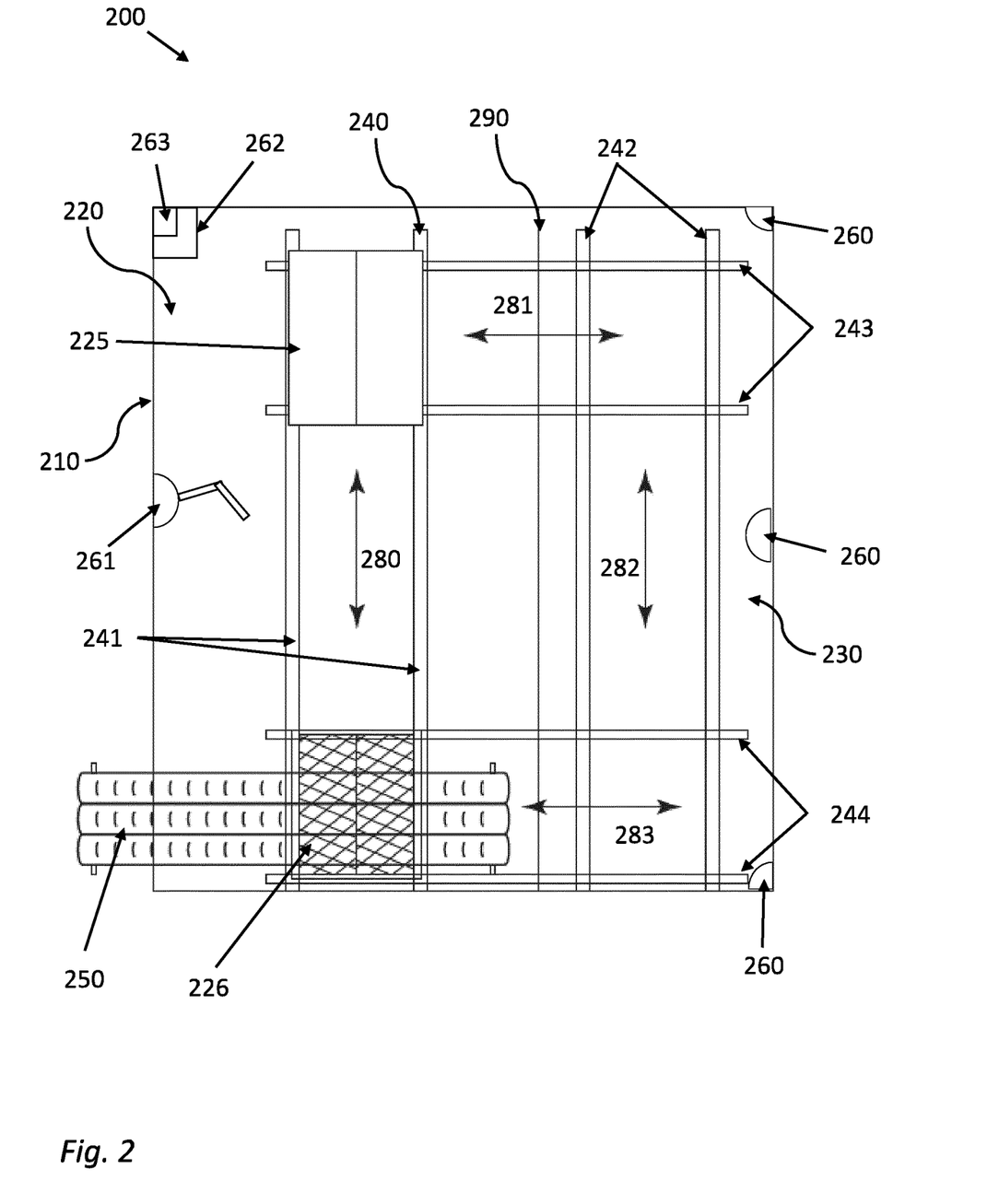
FIG. 2 schematically illustrates a top view of a system for growing biomass.

Referring now to FIG. 2, there is shown a top view of a system 200 for growing biomass. The system 200 comprises a growing unit 210 divided into a first area 220 and a second area 230y a partition 290. The growing unit 210 is further shown comprising a plate-grid device 240 in turn comprising a plate 225 movably supported on a first railing 241 and being composed of two plate sections. The first railing 241 is characterized by two rails supporting opposite edges of the longer dimension of the plate 225. The plate 225 is shown in FIG. 2 in a closed position enabling a first surface to be formed for receiving and holding the growth medium (not shown) during the biomass growing process. FIG. 2 further shows the plate 225 positioned at a loading position. FIG. 2 further depicts the movement 280 the plate 225 follows along the first railing 241 to progress between a loading position and a discharging position throughout the growing process. The movement 280 of the plate 225 is enabled by the first drive mechanism (not shown in FIG. 2 but detailed later in the description). The plate-grid device 240 further comprises a grid 226 movably supported on a second railing positioned under the first railing 241 and encompassing similar characteristics as the first railing 241. The second railing is therefore not visible in FIG. 2 as the first railing 241 and the plate 225 supported thereon are elevated directly above the second railing. The grid 226 is further shown in FIG. 2 in a closed position, having two grid sections jointly forming the second surface of the grid 226 and being formed of a meshing 141 enabling the separation function of the grid 226. FIG. 2 depicts the grid 226 being positioned at the discharging position at which the grid 226 is ready to receive the growth medium and the biomass grown thereon discharged from the plate 225 during the biomass growing process. The movement of the grid 226 along the second railing is in the same direction as the movement 280 of the plate 225 and is enabled by a second drive mechanism (not shown but described later in the description). It is embodied that the movement 280 of the plate 225 and the movement of the grid 226 are independent from one another as they are enabled by different drive mechanisms. FIG. 2 further illustrates a third railing 243 formed of two rails similarly as the first railing 241 and adapted to movably support the plate 225. The third railing 243 is shown oriented perpendicularly to the first railing 241 permitting the movement 281 of the plate 225 away from the first railing 241. It is further embodied that the movement 281 of the plate 225 along the third railing 243 is enabled by the first drive mechanism. Furthermore, FIG. 2 illustrates a fourth railing 244 characterized similarly as the third railing 243 but for movably supporting the grid 226 and enabling the movement 283 of said grid 226 away from the second railing in a perpendicular direction by means of the second drive mechanism. FIG. 2 further shows a fifth railing 242 elongating in a parallel direction as the first railing 241 and enabling the movement 282 of the plate 225 along its tow rails. Although not visible in the top view illustrated in FIG. 2, The plate-grid device 240 further comprises a sixth railing characterized similarly as the fifth railing 242 but for movably supporting the grid 226 and enabling its movement parallel to the movement 282. It is envisioned that the connection between the first railing 241 and the third railing 243, and the connection between the third railing 243 and the fifth railing 242 do not hinder the capacity of the plate 225 to securely hold the growth medium or the capacity of the plate 225 to pivot between the closed and the opened position. Similar characterization may be done for the connection between the second railing and the fourth railing 244, and for the connection between the fourth railing 244 and the sixth railing. It is additionally embodied that the third railing 243 may be attached to the plate 225 and movable along the first railing 241 according to movement 280. For such embodied configuration, the use of the fifth railing 242 is not required. Similarly, it is additionally embodied that that the fourth railing 244 may be attached to the grid 226 and movable along the second railing. For such embodied configuration, the use of the sixth railing is not required. FIG. 2 further illustrates a decontamination device 260 positioned in the second area 230 for decontaminating the plate 225 and the grid 226 when they are moved to/within the second area 230. The growing unit 210 is further shown having a ventilation system 262 operated by a control unit 263 for controlling the controllable environment of the growing unit 210. FIG. 2 further illustrates a movable robotic arm 261 positioned in the first area 220 for performing operations on the growth medium either when the growth medium is held on the plate 225 or on the grid 226 prior to separation or prior to returning the growth medium to the plate 225. It is embodied that the return of the growth medium from the grid to the plate may be done by moving said grid to a first or second railing positioned above the plate, e.g. in the case of a system (not shown) in which a plurality of plate-grid devices is used and positioned elevated from one another in the growing unit. For such system, the growth medium is returned to the plate by transition of the grid from the closed position to the opened position when aligned above said plate. It is further embodied that the growth medium may be returned to the plate 225 by means of the movable robotic arm 261. It is additionally embodied that the movable robotic arm 261 may perform operations, e.g. inseminating, removal of undesired substances, analysis of biomass growth, monitoring of biomass growth, cleaning of growth medium on the growth medium, watering and addition of nutrient, at any position of the plate 225 and/or grid 226 along the first railing 241 and second railing respectively. It is also embodied that the movable robotic arm 261 may alternatively be one of a feeding system, a watering system, a sensor arrangement. The growing unit 210 shown in FIG. 2 enables the growing process of the biomass to fully occur in the first area 210 by the movement 280 of the plate 225 and grid 226 between a loading position and a discharging position and enables the plate 225 and the grid 226 to be decontaminated in the second area 230 without disturbing the growing scheme of the biomass growing process.

Figure 3A:
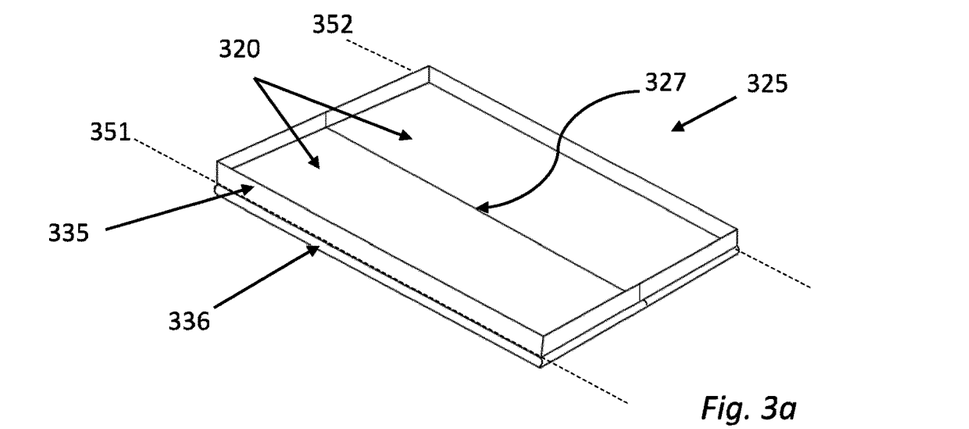
FIG. 3a schematically illustrate a perspective view of a plate of a plate-grid device for growing biomass in a closed position.
Figure 3B:
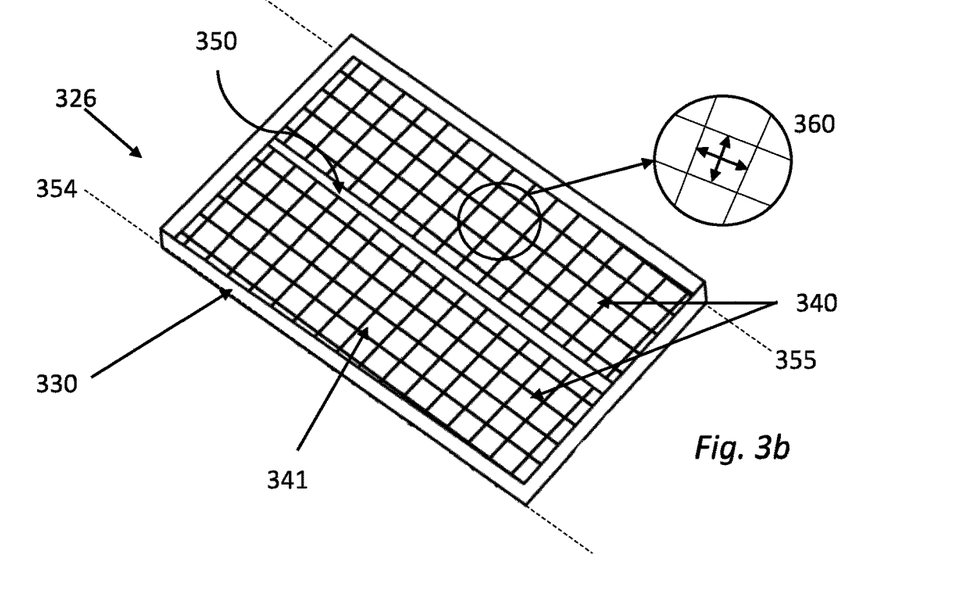
FIG. 3b schematically illustrates a perspective view of a grid of a plate-grid device for growing biomass in a closed position.
Figure 3C:
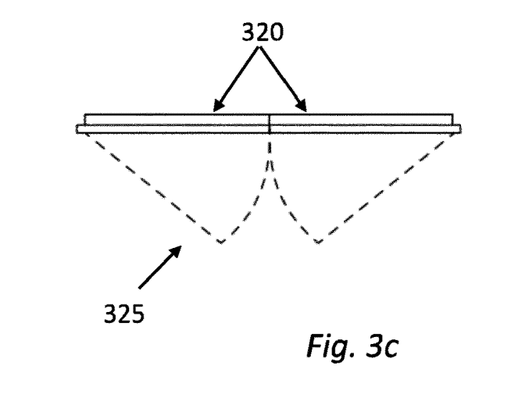
FIG. 3c schematically illustrate a side view of a plate of a plate-grid device for growing biomass in a closed position.
Figure 3D:
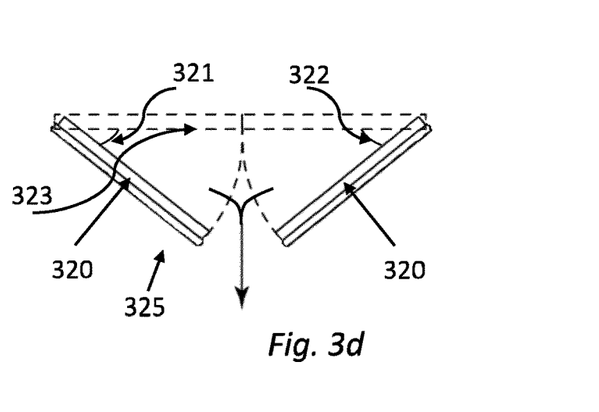
FIG. 3d schematically illustrate a side view of a plate of a plate-grid device for growing biomass in an opened position.

Referring now to FIG. 3a, there is shown a perspective views of a plate 325 of a plate-grid device for growing biomass in a closed position. FIG. 3a illustrates the plate 325 having two plate sections 220 jointly forming the first surface said plate 325. FIG. 3a further shows borders 335 arrange along the perimeter of the plate 325, more specifically along at least a portion of the perimeter of each plate sections 320. The borders 335 elongate in an upward direction perpendicular to the first surface formed by the two plate sections 320 and may preferably have a height ranging from 0.5 cm to 10 cm. The plate 325 comprises a thermoregulating device 336 in the form of a heating coil arranged along at least a portion of the perimeter of the first surface of the plate 325. FIG. 3a further illustrates a first axis 351 and a second axis 352 elongating along the longer dimensioned edges of the plate 325, about which the two plate sections 320 may pivot to transition between the closed position and the opened position. The two plate sections 320 are further shown joining in the center of the plate 325 at the junction line 327. It is additionally embodied that the two plate sections 320 jointly forming the first surface may be releasably connected together at the junction line 327 by means of any suitable mechanism or electro-mechanism (not shown). Although not shown in FIG. 3a, it is further embodied that at least one of the two plate sections 320 may be extendable such that the area of the first surface formed by the two plate sections 320 may be increased. By the term "extendable" it is here meant that at least one dimension (e.g. width and/or length if the two plate sections are of rectangular or square shape) of at least one of the two plate sections may be varied to increase the area of the at least one of the two plate sections, for example via a telescopic mechanism or simply via an overlap of one of the two plate sections over the other plate section at the junction line 327. The possibility of increasing the area of the first surface provides the advantage of adapting the area of the first surface of the plate 325 to the variation of the density of the growing biomass. In other words, for a plate 325 on which a larger density of biomass is observed on the growth medium, at least one of the two plate sections 320 may be extended such that the total area of the first surface accommodates the biomass without compromising its growth. It is additionally embodied that for a case in which the dimensions of the plate 325 are significantly large and the weight of the growth medium (not shown) by the first surface of the plate 325 is considerably heavy, a support mechanism (not shown) may be arranged beneath each of the two plate sections 320 to increase the retention capacity of the plate 325. It will further be appreciated that such support mechanism may be formed of a thermo-conductive material permitting its participation in the regulation of the temperature of the plate 325 enabled by the thermoregulating device 336. FIG. 3b illustrates a perspective view of a grid 326 in a closed position. The grid 326 comprises two grid sections 340 jointly forming the second surface of the grid 326 and joining at the junction line 328. FIG. 3b shows the two grid sections 340 being formed of a meshing 341 comprising linked threads of metallic or plastic material enabling the second surface formed by the two grid sections 340 to be covered by mesh openings 360. The mesh openings 360 are shown in FIG. 3b having similar dimensions across the second surface and which allows particles of a specific granulometric dimension to pass therethrough. FIG. 3b further illustrates the third axis 354 and the fourth axis 355 elongating along the longer dimensioned edges of the grid 326, about which the two grid sections 340 may pivot to transition between the closed position and the opened position. Similarly to the plate 325 of FIG. 3a, the grid 326 shown in FIG. 3b comprises borders 330 arranged around its perimeter. FIG. 3c illustrates a side view of a plate 325 in a closed position. The side view of FIG. 3c shows the smaller dimensioned edge of the plate 325 similarly dimensioned as the plate 325 of FIG. 3a. FIG. 3c depicts the plate 325 having two plate sections 320 joined at their inner edge to enable the closed position of the plate 325. The dotted lines shown in FIG. 3c illustrate the trajectory followed by the two plate sections 320 when pivoting to the opened position. FIG. 3d illustrates a side view of the plate 325 in an opened position, i.e. after pivoting of the two plate sections 320. The two plate sections 320 shown in FIG. 3d form respective angles 321, 322 with the plane 323 representing the first surface of plate 325 in a closed position shown here in dotted lines. The respective angles 321, 322 formed by each plate sections 320 in the opened position may preferably range from 0.5° to 89.5°. It will additionally be embodied that the respective angles 321, 322 may have different values. The plate 325 shown in the opened position in FIG. 3d permits the growth medium (not shown) to be slidably released as depicted by the arrow.

Figure 4:
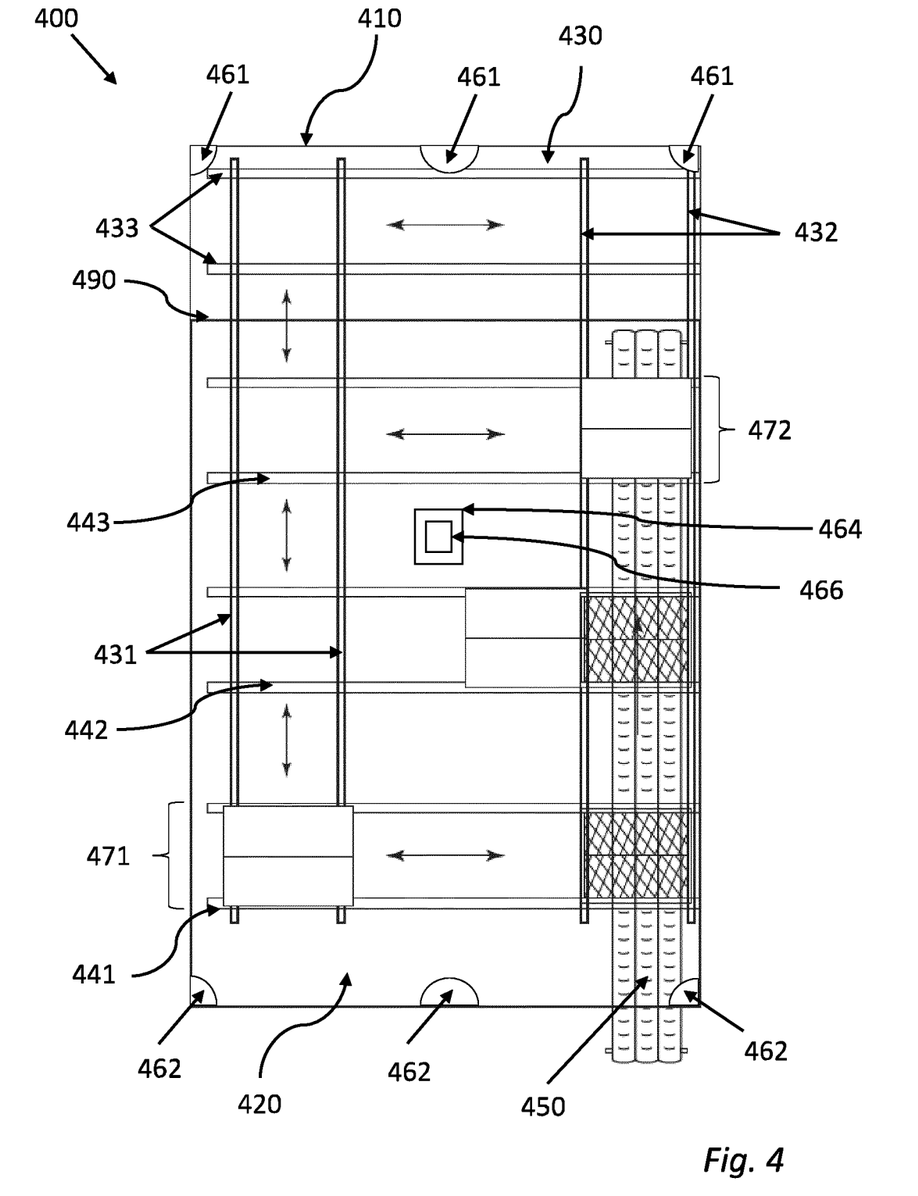
FIG. 4 schematically illustrates a side view of a system for growing biomass.

Referring now to FIG. 4, there is shown a top view of a system 400 for growing biomass. The system comprises a growing unit 410 separated into a first area 420 and a second area 430 by a partition 490. FIG. 4 further illustrate a plurality of plat-grid devices 441, 442, 443 each comprising a plate and a grid movably supported by respective first and second railings and movable along said respective first and second railings. Each of the respective first railings of the plurality of plate-grid devices 441, 442, 443 are connected together and with the fifth railing 433 via the third railing 431 enabling the independent movement of each plates of each plate-grid device 441, 442, 443 from the first area 420 in which the biomass growing process occurs, to the second area 430 in which the decontamination of said plates occurs. Similarly for the grids of each plat-grid device 441, 442, 443, each of the respective second railings of the plurality of plate-grid devices 441, 442, 443 are connected together and with the sixth railing (not visible) via the fourth railing 432 enabling the independent movement of each grids of each plate-grid device 441, 442, 443 from the first area 420 to the second area. FIG. 4 further depicts a transporting mechanism 450 positioned underneath each grid of the plurality of plate-grid devices 441, 442, 443 at their respective discharging position, e.g. 472, enabling the transport of separated biomass of each grids of the plurality of plate-grid device from the first area 420 to the outside of the growing unit 410. FIG. further shows a decontamination device 461 positioned in the second area 430 for decontaminating the plates and grids of the plurality of plate-grid devices 441, 442, 443 and the second area 430 itself. An additional decontamination device 462 is further shown positioned in the first area 420 for decontamination of the first area 420. FIG. 4 further illustrate a ventilation system 464 positioned in the center of the first area 420 for controlling the controllable environment of the growing unit 410 and a control unit 466 for operating the decontamination device 461, the additional decontamination device 462 and the ventilation system 464. Additionally, FIG. 4 illustrates the plate of the first plate-grid device 441 positioned at its loading position 471 and the grid of the first plate-grid device 441 positioned at its discharging position. The plate of the second plate-grid device 442 is shown positioned between its loading position and its discharging position and the plate of the third plate-grid device 443 is shown positioned at its discharging position 472 superimposed above the grid of the plate-grid device 443. Although shown constantly at its discharging position in FIG. 4, it is embodied that the grids of each plate-grid devices 441, 442, 443 are movable between their respective loading position and discharging position. It is additionally embodied that the plates and grids of each plate grid devices 441, 442, 443 may be transferable between each plate grid devices 441, 442, 443 via the third riling 431 and the fourth railing 432.

Figure 5:
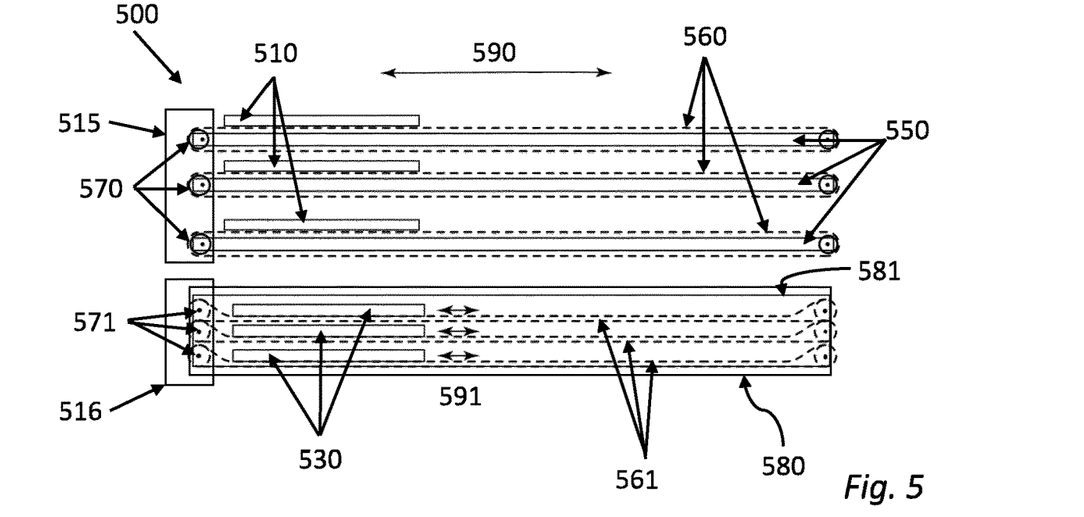
FIG. 5 schematically illustrates a side view of a plate grid-device for use in a system for growing biomass.

Referring now to FIG. 5, there is shown a side view of a plate grid-device 500 for use in a system for growing biomass. FIG. 5 shows the plate-grid device 500 comprising a plurality of plates 510 movably supported on respective first railings 550 wherein each of the first railings 550 is positioned one above the other and above the second railing 580. The movement 590 of the plurality of plates 510 is shown in FIG. 7 enabled by the first drive mechanism 515 which comprises a plurality of chains 560 engaging the longer dimensioned edge of each plate 510 and arranged around each respective first railings 550 supporting each plate 510. FIG. 5 further depicts the first drive mechanism 515 comprising motor driven sprockets 570 for moving each chain 560 individually along each respective first railing 550, enabling the movement 590 of each plate 510. FIG. 5 further shows the second railing 580 aligned below the plurality of first railings 550 and comprising a separate channel 581 for supporting each grid 530. Similarly to the first drive mechanism 515, the second drive mechanism 516 is shown comprising a plurality of chains 561 engaging the longer dimensioned edge of each grid 530. FIG. 5 further shows the second drive mechanism comprising motor driven sprockets 571 for moving each chain 561 individually along the separate channel, enabling the movement 591 of each grid 530. It will be additionally embodied that the plurality of grids 530 form a multi-layer grid assembly.

Figure 6:
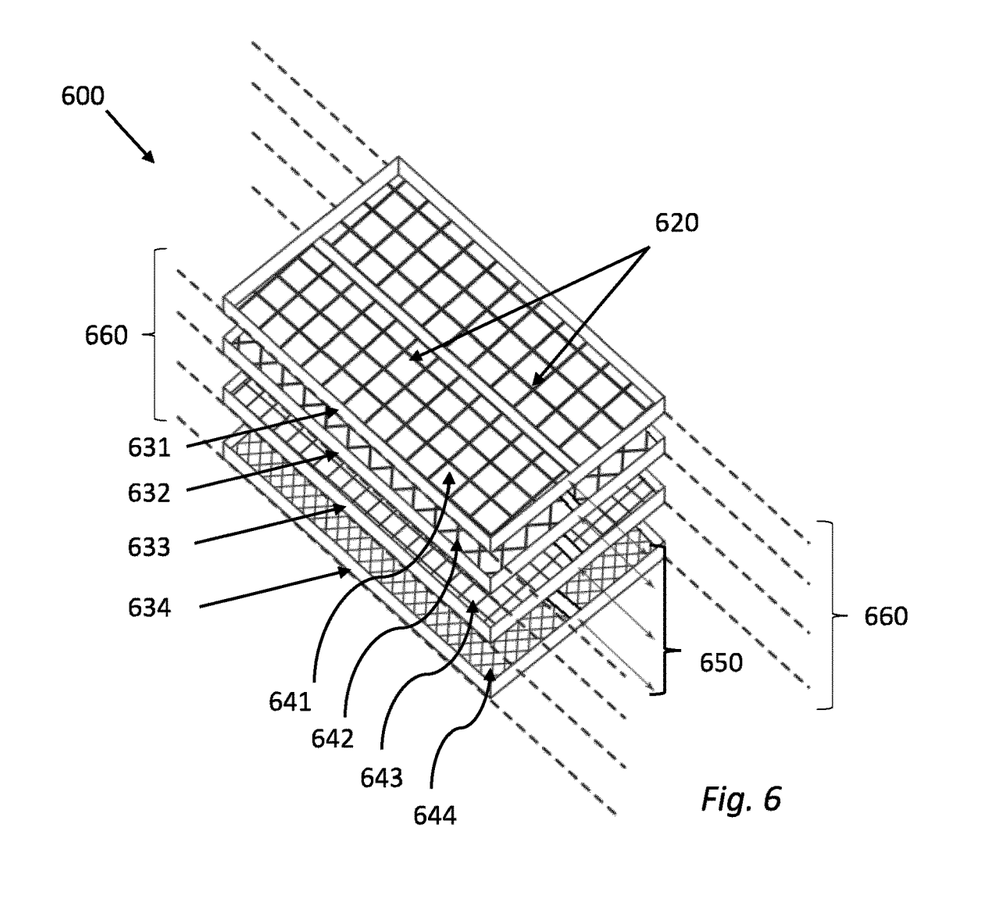
FIG. 6 schematically illustrates a perspective view of a grid configuration of a plate-grid device used in a system for growing biomass.

Referring now to FIG. 6, there is shown a perspective view of a grid configuration 600 of a plate-grid device used in a system for growing biomass. The grid configuration 600 is used to perform the separation of grown biomass from the growth medium and other undesirable substances and is shown comprising a plurality of grids, i.e. a first grid 631, a second grid 632, a third grid 633 and a third grid 634 elevated from one another. Each grid 631, 632, 633, 634 is shown in FIG. 6 comprising two grid sections 620 jointly forming the second surface of each grids 631, 632, 633, 634 and formed of respective meshing 641, 642, 642, 644. FIG. 6 further illustrates the meshing 641 having the largest dimension of mesh opening and the meshing 644 having the smallest dimension of mesh openings. The mesh openings of the meshing 642 of the second grid 632 are shown having smaller dimensions than the mesh openings of the meshing 641 of the first grid 631, but larger than the dimensions of the mesh openings of the meshing 643 of the third grid 633. Similarly, the mesh openings of the meshing 643 of the third grid 633 are shown in FIG. 6 having larger dimensions than the mesh openings of the meshing 644 of the fourth grid 634. FIG. 6 therefore illustrates a gradual diminution of dimensions of mesh openings from the first grid 631 to the fourth grid 634 of the grid configuration 600. Additionally, FIG. 6 depicts the respecting pivoting axis' 660 elongating along the longer edges of the respective grids 631, 632, 633, 634 about which the two grid sections 620 of each grid 631, 632, 633, 634 may pivot to transition between the closed position and the opened position. Moreover, FIG. 6 shows the direction 650 of the independent movement of each grid 631, 632, 633, 634 enabled by the second drive mechanism (not shown).

Figure 7:
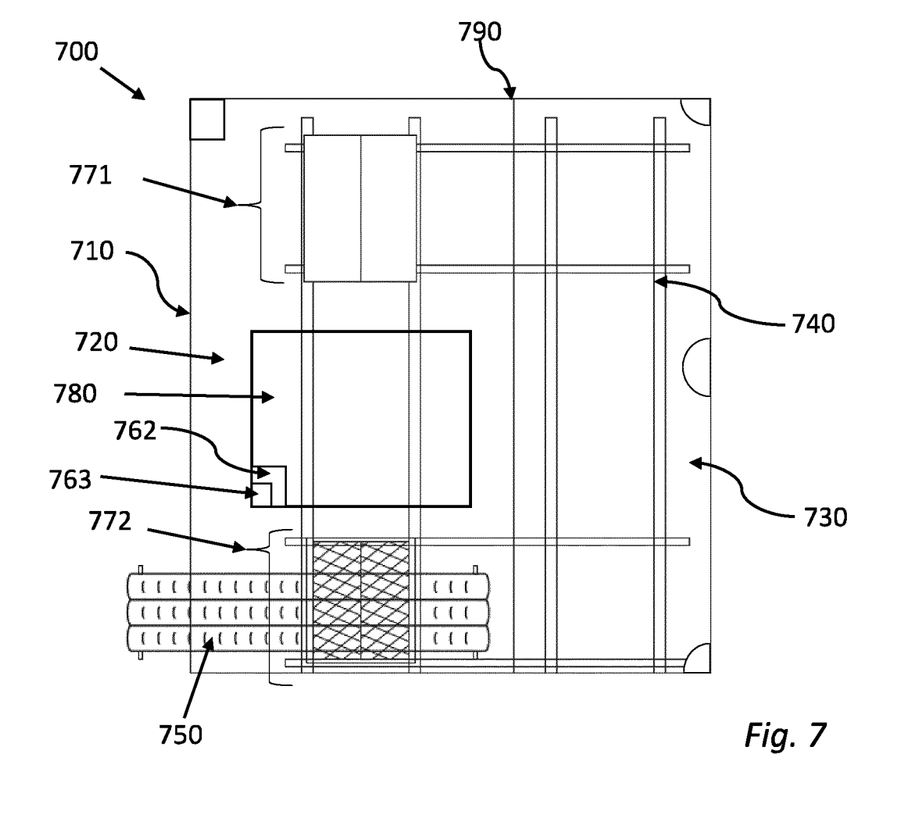
FIG. 7 schematically illustrates a top view of a system for growing biomass.

Referring now to FIG. 7, there is shown a top view of a system 700 for growing biomass. The system 700 comprises a growing unit 710 separated into a first area 720 and a second area 730 by a partition 790. FIG. 7 further shows a transporting mechanism 750 arranged in the first area 720 extending from said first area 720 to the outside of the growing unit 710 for transporting harvested biomass out of the growing unit 720. A plate-grid device 740 characterized similarly as the plate-grid devices related to in previous FIGS. is shown positioned in in the growing unit 710. FIG. 7 further illustrates an auxiliary area 780 at least partially isolated from the rest of the first area 710 and through which the plate and/or grid of the plate-grid device may pass when moving between the loading position 771 and the discharging position 772. The auxiliary area 780 is shown comprising its respective ventilation system 762 operated by a control unit 762 for controlling its controllable environment differently than the controllable environment of the growing unit 710. It is additionally embodied that the auxiliary area 780 may be dimensioned differently than shown in FIG. 7.

Figure 8A:
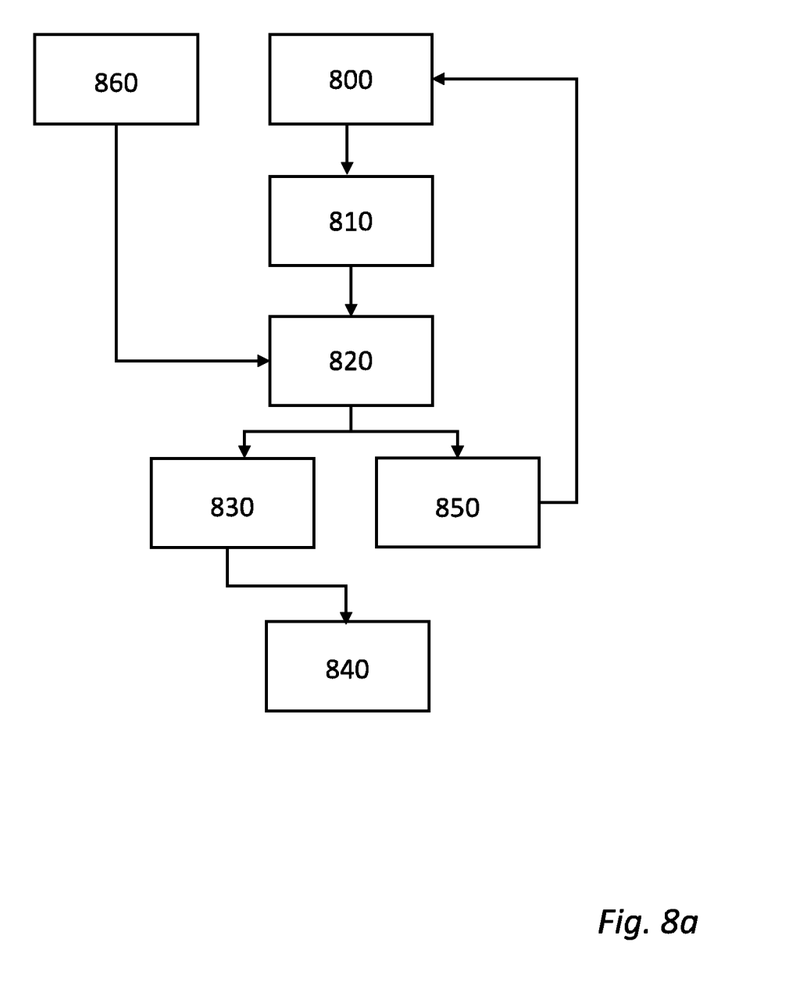
FIG. 8a-8c schematically illustrates method steps of a method for growing biomass using the system of FIG. 1-7.
Figure 8B:
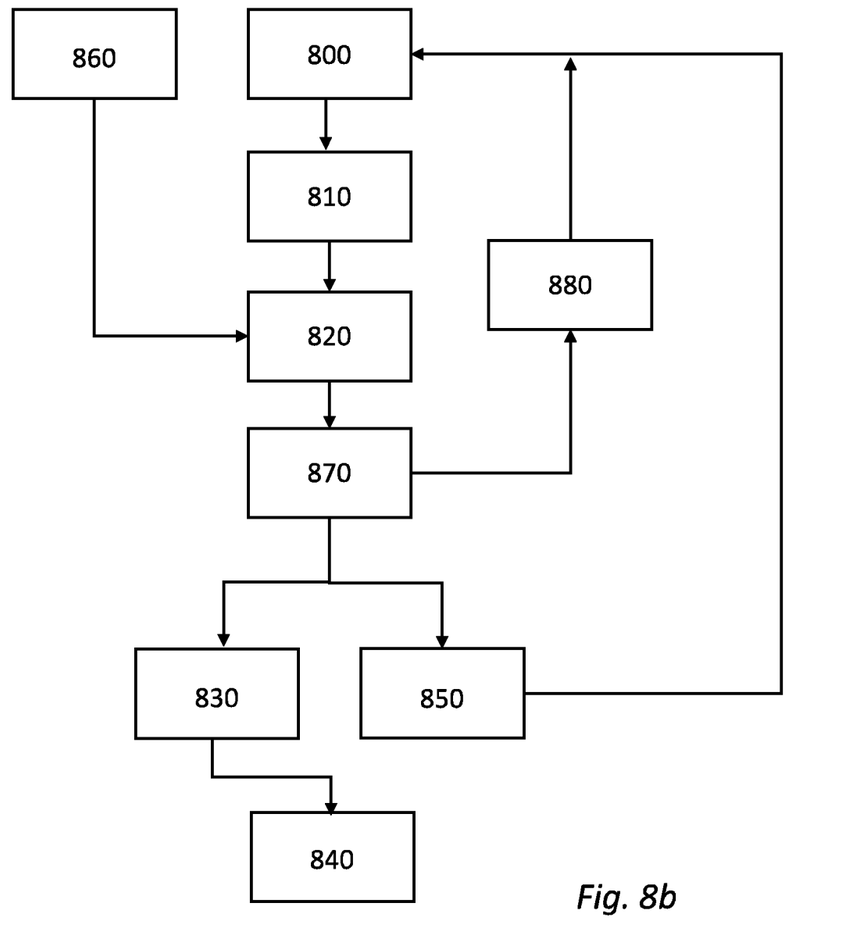
Figure 8C:
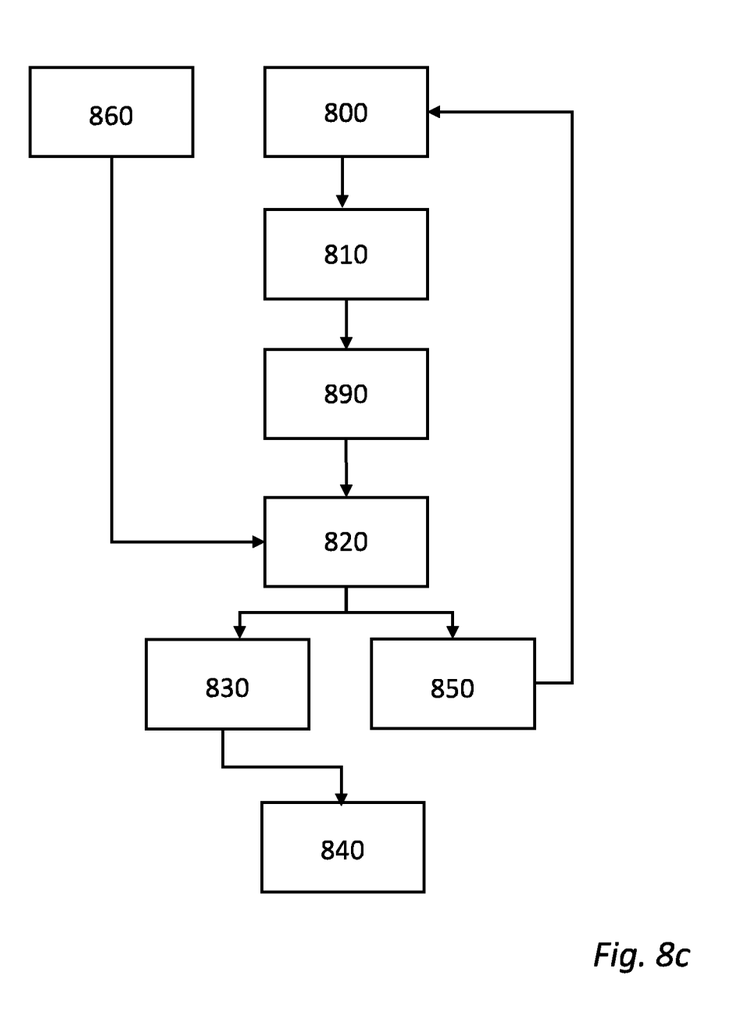

Referring now to FIG. 8a, there is shown a block diagram illustrating the steps of method for growing biomass. FIG. 8a illustrates the steps of receiving 800 a growth medium on the plate of the plate-grid device at the loading position in the first area of the growing unit, containing 810 the growth medium on the at plate in the first area for the duration of a growth period of the biomass, discharging 820 the growth medium onto the grid of the plate-grid device at the discharging position in the first area of growing unit, separating 830 the grown biomass and undesirable substances of the growth medium by means of the at least one grid, and discharging 840 the grown biomass onto the transport mechanism and transporting it to the third area. FIG. 8a further shows the step of decontaminating 850 the plate of the plate-grid device in the second area by means of the decontamination device occurring simultaneously as the step of separating 830 the grown biomass by means of the at the grid. FIG. 8a further shows the step of decontaminating 960 the grid of the plate-grid device in the second area by means of the decontamination device occurring simultaneously as the step of receiving 800 the growth medium on the plate. FIG. 8b shows a block diagram illustrating the steps of the method for growing biomass comprising a first operation phase. FIG. 8b comprises the same steps 800 to 860 as defined in FIG. 8a and further comprises the step of performing a first operation phase 870 on the growth medium on the grid of the plate-grid device by means of e.g. the movable robotic arm as depicted in FIG. 2, wherein the first operation phase comprises at least one operation from inseminating, removal of undesired substances, analysis of biomass growth, monitoring of biomass growth, cleaning of growth medium. FIG. 8b further illustrates the optional step of returning 880 the growth medium from the grid to the plate of the plate-grid device after having completed the step of performing the first operation phase 870. FIG. 8c shows a block diagram illustrating the steps of the method for growing biomass comprising a second operation phase. FIG. 8c comprises the same steps 800 to 860 as defined in FIG. 8a and further comprises the step of performing a second operation phase 890 on the growth medium on plate of the plate-grid device by means of e.g. the movable robotic arm as depicted in FIG. 2, wherein the second operation phase comprises at least one operation from watering and addition of nutrient. FIG. 8c shows the step of performing the second operation phase 890 occurring before the step of discharging 820 the growth medium onto the grid of the plate-grid device at the discharging position. It is additionally embodied that the steps of performing a first operation phase 870, the step of returning 880 the growth medium from grid to plate of the plate-grid device and the step of performing a second operation phase 890 on the growth medium on plate of the plate-grid device may be combined together and with the steps 800 to 860 to form the method for growing biomass.

As is readily appreciated by the person skilled in the art, many modifications and variations may be devised given the above description of the principles of the inventive concept. It is intended that all such modifications and variations be considered as within the scope of the inventive concept, as it is defined in the appended patent claims.

The invention claimed is:

1. A system for growing biomass, the system comprising;
at least one growing unit having a respective controllable environment and comprising a first area and a second area;
at least one plate-grid device arranged within said at least one growing unit, comprising at least one plate elevated from at least one grid wherein the at least one plate and the at least one grid are independently movable from one another between the first area and the second area,
a decontamination device arranged within the second area and configured to decontaminate, in the second area, one or more of the at least one plate and/or at least one grid of the at least one plate-grid device;
wherein the at least one plate and at least one grid of each at least one plate-grid device are movable independently from the at least one plate and at least one grid of the other plate grid-devices between a loading position at which the at least one plate is free to receive a growth medium for growing biomass, and a discharging position, at which the at least one plate is configured to discharge the growth medium onto the at least one grid, within the first area;
at least one transporting mechanism configured to transport grown biomass discharged from the at least one plate-grid device at the discharging position, to a third area arranged outside of the at least one growing unit.

2. The system according to claim 1, wherein the system further comprises at least one or more of a movable robotic arm, a feeding system, a watering system, a sensor arrangement arranged in the first area and adapted to perform a plurality of operations on the growth medium on the at least one plate-grid device, wherein the plurality of operations comprises at least one of: insemination, watering, removal of undesired substances, addition of nutrients, analysis of biomass growth, monitoring of biomass growth, cleaning of growth medium.

3. The system according to claim 1, further comprises at least one of a heating system, a cooling system, a ventilation system, configured to control the respective controllable environment according to one or more respective growing schemes.

4. The system according to claim 3, further comprising at least one control unit, wherein the at least one control unit is configured to operate the at least one of a heating system, a cooling system, a ventilation system to control one or more of a temperature, a pressure, a humidity of the respective controllable environment.

5. The system according to claim 4, wherein the at least one control unit is configured to individually control the respective controllable environment of the at least one growing unit.

6. The system according to claim 1, wherein the at least one growing unit is arranged in a growing space having a respective controllable environment.

7. The system according to claim 1, wherein the first area and the second area of the at least one growing unit are separated by a partition, wherein the partition is configured to allow the at least one plate-grid device to move therethrough.

8. The system according to claim 1, further comprising an auxiliary area arranged within the first area, wherein the at least one of a temperature, a pressure, a humidity within the auxiliary area is respectively controlled by at least one of an auxiliary heating system, an auxiliary cooling system, an auxiliary ventilation system operated by the at least one control unit.

9. The system according to claim 1, wherein the decontamination device comprises at least one of a sprinkler arrangement, a hose arrangement, a washing tunnel.

10. The system according to claim 1, further comprising an additional decontamination device arranged in the first area and configured to decontaminate the first area, wherein the additional decontamination device comprises at least one of a sprinkler arrangement and a hose arrangement.

11. The system according to claim 1, wherein the at least one control unit is further configured to operate the at least one of a movable robotic arm, a feeding system, a watering system, a sensor arrangement.

12. A method for growing biomass using a system, wherein the system comprises:
    at least one growing unit having a respective controllable environment and comprising a first area and a second area;
    at least one plate-grid device arranged within said at least one growing unit, comprising at least one plate elevated from at least one grid, wherein the at least one plate and the at least one grid are independently movable from one another between the first area and the second area,
    a decontamination device arranged within the second area and configured to decontaminate, in the second area, at one of the at least one plate and/or at least one grid of the at least one plate-grid device;
    wherein of each of the at least one plate grid device is movable independently from the at least one plate and at least one grid of the other plate grid devices between a loading position and a discharging position within the first area;
    at least one transporting mechanism configured to transport grown biomass discharged from the at least one plate-grid device at the discharging position, to a third area arranged outside of the at least one growing unit;
    at least one or more of a movable robotic arm, a feeding system, a watering system, a sensor arrangement arranged in the first area and adapted to perform a plurality of operations on the growth medium on the at least one plate-grid device
wherein the method comprises the steps of:
    receiving a growth medium on the at least one plate at the loading position in the first area of the at least one growing unit;
    containing the growth medium on the at least one plate in the first area for the duration of a growth period of the biomass;
    discharging the growth medium onto the at least one grid at the discharging position in the first area of the at least one growing unit;
    separating the grown biomass and undesirable substances of the growth medium by means of the at least one grid;
    discharging the grown biomass onto the transport mechanism and transporting said grown biomass to the third area;
    decontaminating the at least one plate in the second area by means of the decontamination device;
    decontaminating the at least one grid in the second area by means of the decontamination device;
wherein the step of decontaminating the at least one plate occurs simultaneously as the step of separating the grown biomass by means of the at least one grid,
wherein the step of decontaminating the at least one grid occurs simultaneously as the step of receiving the growth medium on the at least one plate.

13. The method according to claim 12, further comprising the step of performing a first operation phase on the growth medium on the at least one grid by means of the one or more of a movable robotic arm, a feeding system, a watering system, a sensor arrangement, wherein the first operation phase comprises at least one operation from inseminating, removal of undesired substances, analysis of biomass growth, monitoring of biomass growth, cleaning of growth medium.

14. The method according to claim 12, further comprising the step of returning the growth medium from the at least one grid to the at least one plate by positioning the at least one gird above the at least one plate and discharging said growth medium.

15. The method according to claim 12, further comprising the step of performing a second operation phase on the growth medium on the at least one plate by means of the one or more of a movable robotic arm, a feeding system, a watering system, a sensor arrangement, wherein the second operation phase comprises at least one operation from watering and addition of nutrient.

* * * * *